United States Patent
Kouno et al.

(10) Patent No.: US 11,248,654 B2
(45) Date of Patent: Feb. 15, 2022

(54) OIL IMPREGNATED SINTERED BEARING AND PRODUCTION METHOD THEREOF

(71) Applicant: DIAMET CORPORATION, Niigata (JP)

(72) Inventors: Hajime Kouno, Kitamoto (JP); Yoshinari Ishii, Niigata (JP); Tsuneo Maruyama, Niigata (JP); Jyun Katou, Kitamoto (JP); Kenji Orito, Kitamoto (JP)

(73) Assignees: MITSUBISHI MATERIALS CORPORATION, Tokyo (JP); DIAMET CORPORATION, Niigata (JP)

( * ) Notice: Subject to any disclaimer, the term of this patent is extended or adjusted under 35 U.S.C. 154(b) by 0 days.

(21) Appl. No.: 16/763,500

(22) PCT Filed: Nov. 14, 2018

(86) PCT No.: PCT/JP2018/042139
§ 371 (c)(1),
(2) Date: May 12, 2020

(87) PCT Pub. No.: WO2019/098240
PCT Pub. Date: May 23, 2019

(65) Prior Publication Data
US 2020/0325934 A1    Oct. 15, 2020

(30) Foreign Application Priority Data

Nov. 15, 2017   (JP) .............................. JP2017-219996

(51) Int. Cl.
*F16C 17/02*     (2006.01)
*F16C 33/10*     (2006.01)
(Continued)

(52) U.S. Cl.
CPC .......... *F16C 33/1065* (2013.01); *F16C 17/02* (2013.01); *F16C 33/104* (2013.01);
(Continued)

(58) Field of Classification Search
CPC .... F16C 17/02; F16C 33/104; F16C 33/1065; F16C 33/128; F16C 33/145;
(Continued)

(56) References Cited

U.S. PATENT DOCUMENTS 1,236,511 A  *  8/1917  Waring ................. F16C 17/028
                                                     384/291
5,282,688 A     2/1994  Kanezaki et al.
(Continued)

FOREIGN PATENT DOCUMENTS

DE      3326316 A       2/1985
EP      0877866 B1  *  10/1999  ............ F16C 33/046
(Continued)

OTHER PUBLICATIONS

International Search Report dated Feb. 5, 2019 for the corresponding PCT International Patent Application No. PCT/JP2018/042139.
(Continued)

*Primary Examiner* — Marcus Charles
(74) *Attorney, Agent, or Firm* — Leason Ellis LLP

(57) ABSTRACT

On an inner peripheral surface of a bearing hole into which a shaft is inserted, concave oil supply surfaces arranged dispersively like separated islands and a sliding surface continuous around the oil supply surfaces to hold an outer peripheral surface of the shaft are formed: a maximum height difference between the sliding surface and the oil supply surfaces is not less than 0.01% and not more than 0.5% of an inner diameter Di of the sliding surface; a surface aperture area ratio of pores at the sliding surface is not more than 10%; a surface aperture area ratio of pores at the oil
(Continued)

supply surfaces is more than 10% and less than 40%; and an area of each of the oil supply surfaces is not less than 0.03 mm$^2$ and not more than $0.2 \times Di^2$ (mm$^2$).

16 Claims, 8 Drawing Sheets

(51) Int. Cl.
*F16C 33/12* (2006.01)
*F16C 33/14* (2006.01)

(52) U.S. Cl.
CPC .......... *F16C 33/128* (2013.01); *F16C 33/145* (2013.01); *F16C 2202/10* (2013.01); *F16C 2220/20* (2013.01); *F16C 2223/04* (2013.01); *F16C 2240/44* (2013.01); *F16C 2240/70* (2013.01); *F16C 2240/90* (2013.01); *Y10T 29/49668* (2015.01)

(58) Field of Classification Search
CPC .............. F16C 2202/10; F16C 2220/20; F16C 2223/04; F16C 2240/44; F16C 2240/70; F16C 2240/90; Y02T 10/89; Y10T 29/49668
USPC ............ 384/283–286, 288, 293; 29/898.054, 29/898.057, 898.14
See application file for complete search history.

(56) References Cited

U.S. PATENT DOCUMENTS

| | | | | | |
|---|---|---|---|---|---|
| 6,095,690 | A | * | 8/2000 | Niegel | F16C 33/1075 384/293 |
| 7,399,122 | B2 | * | 7/2008 | Fujita | F16C 9/02 384/276 |
| 8,381,696 | B2 | * | 2/2013 | Urabe | F16J 10/04 123/193.2 |
| 9,222,511 | B2 | * | 12/2015 | Lee | F16C 33/1065 |
| 9,334,899 | B2 | * | 5/2016 | Krebs | F16C 39/02 |
| 9,618,039 | B2 | * | 4/2017 | Arnold | F16C 17/02 |
| 2014/0334755 | A1 | | 11/2014 | Krebs et al. | |

FOREIGN PATENT DOCUMENTS

| | | | | |
|---|---|---|---|---|
| EP | 3396186 | A1 | 10/2018 | |
| JP | 04-307111 | A | 10/1992 | |
| JP | 05-115146 | A | 5/1993 | |
| JP | 08-291823 | A | 11/1996 | |
| JP | 2001-279301 | A | 10/2001 | |
| JP | 2004144255 | A * | 5/2004 | ............ F16C 33/103 |
| JP | WO2006123453 | A1 * | 12/2008 | .............. B22F 7/004 |
| JP | 2010-007141 | A | 1/2010 | |
| JP | 2010-031909 | A | 2/2010 | |
| JP | 2016-193474 | A | 11/2016 | |
| KR | 20110029338 | A * | 3/2011 | ............ F16C 33/104 |
| KR | 20110071928 | A * | 6/2011 | ............ F16C 33/103 |
| KR | 1616015 | B1 * | 4/2016 | .............. F16C 17/02 |
| WO | WO-2017/110778 | A1 | 6/2017 | |

OTHER PUBLICATIONS

Extended European Search Report dated Sep. 9, 2021 for the corresponding European Patent Application No. 188774496.2.

* cited by examiner

OIL IMPREGNATED SINTERED BEARING AND PRODUCTION METHOD THEREOF

CROSS-REFERENCE TO RELATED PATENT APPLICATIONS

This application is a U.S. National Phase Application under 35 U.S.C. § 371 of International Patent Application No. PCT/JP2018/042139 filed on Nov. 14, 2018 and claims the benefit of Japanese Patent Application No. 2017-219996, filed Nov. 15, 2017, all of which are incorporated herein by reference in their entireties. The International Application was published in Japanese on May 23, 2019 as International Publication No. WO/2019/098240 under PCT Article 21(2).

BACKGROUND OF THE INVENTION

Technical Field

The present invention relates to an oil impregnated sintered bearing in which smooth lubrication can be performed by impregnating lubricant oil inside, and a manufacturing method thereof.

Background Art

An oil impregnated sintered bearing is used in a state in which lubricant oil is impregnated in pores; and holds a shaft in a state in which the lubricant oil is exuded from an inside of the bearing by a temperature change and pressure generated between the shaft and the bearing with rotation of the shaft. The oil impregnated sintered bearing is broadly utilized for bearings of motors for vehicles since it can be used for a long time without oil supply by such a lubricant property.

In the oil impregnated sintered bearing like this, applied is a means of reducing a leakage of the lubricant oil from a sliding surface in order to maintain the lubricant oil on the sliding surface, by closing a part of pores to generate a pressure suitably, or by reducing the pores inside the bearing to increase a passage resistance of the lubricant oil.

For example, Japanese Unexamined Patent Application, First Publication No. H04-307111 discloses a method of manufacturing an oil impregnated sintered bearing by sintering a green compact in which pores on an inner peripheral surface of a through hole (a bearing hole) are partly clogged when forming the green compact before sintering. In this oil impregnated sintered bearing, the shaft is held at the parts in which the pores are closed in the inner peripheral surface of the bearing hole; the oil is exuded from the parts in which the pores are not closed and supplied to the parts in which the pores are closed.

In this case, on a rod forming the through hole, a roughening part having a larger surface roughness than the other part is formed on a part of an outer peripheral surface, in a belt shape along an axis direction of the rod. Circumferences of the pores are plastically moved into the pores by pressed by the roughening part of the rod, so that the pores are closed when the powder is pressurized and formed. Japanese Unexamined Patent Application, First Publication No. H04-307111 also describes that the parts in contact with the roughening part are formed to be slightly convex, and pressed by the following sizing machining so as to be level with the inner peripheral surface of the bearing hole.

Japanese Unexamined Patent Application, First Publication No. H05-115146 discloses an oil impregnated sintered bearing in which stepped sections having a sliding surface are formed on an inner peripheral surface of a bearing hole along a circumferential surface, so that a space is formed between a shaft and a bottom surface of a groove between the stepped sections adjacent to each other, and air permeability at the sliding surface is smaller than air permeability at the inner peripheral surface of the bearing hole (the bottom surface of the groove).

In this case, the air permeability at the sliding surface is set at $3 \times 10^{-10}$ (cm$^2$); the air permeability at the bottom surface of the groove is set at $30 \times 10^{-10}$ (cm$^2$); and a height at the stepped sections is set at 0.02 (mm). Closing holes by plating or coating is mentioned as a means for reducing the air permeability at the sliding surface. Japanese Unexamined Patent Application, First Publication No. H05-115146 describes that the oil impregnated sintered bearing can maintain a certain intake and discharge since the shaft is in contact with the sliding surface but not in contact with the bottom surface of the groove with the large air permeability; and also dynamic pressure can be generated enough at a space surrounded by the groove and the shaft.

Japanese Unexamined Patent Application, First Publication No. 2016-194374 discloses a sintered bearing in which dimples are formed on a bearing surface by plastic machining such as peening, rolling, embossing and the like. In this bearing, a sliding area is reduced since the dimples are formed. Accordingly, contact between the bearing surface and a rotation shaft is reduced, and simultaneously fluid resistance of lubricant is reduced while the shaft rotation; so it is possible to reduce frictional resistance on the rotation shaft. Moreover, Japanese Unexamined Patent Application, First Publication No. 2016-194374 describes that frictional coefficient at the bearing surface can be reduced since an oil film is easily formed because the lubricant impregnated in the bearing is saved in the dimples, the lubricant saved in the dimples are exuded between the bearing surface and the rotation shaft when the rotation shaft rotates.

Technical Problem

However, Japanese Unexamined Patent Application, First Publication No. H04-307111 does not describe specific air permeability at a surface formed by the roughening part and surfaces of the other parts. By the air permeability of an extent described in Japanese Unexamined Patent Application, First Publication No. H05-115146, it is difficult to reduce leakage of oil from the sliding surface with supplying sufficient oil when the bearing works with high speed rotation or the like, so that seizing and the like may occur.

The frictional coefficient can be reduced by forming the dimples as described in Japanese Unexamined Patent Application, First Publication No. 2016-194374 though, there is no effect of pumping action circulating the lubricant oil in the oil impregnated sintered bearing because the dimples are formed by plastic machining so that the pores are closed: accordingly, it cannot be used for high speed and high load because the friction becomes large.

The present invention is achieved in consideration of the above circumstances, and has an object to improve a frictional property of bearings and enable to use in environment of high speed and high load by supplying sufficient amount of oil to the sliding surface and reducing movement of the supplied oil from the sliding surface to the inside of the bearing so as to reduce the frictional coefficient.

SUMMARY OF THE INVENTION

Solution to Problem

An oil impregnated sintered bearing of the present invention is formed from a porous body with pores, including a bearing hole into which a shaft is inserted, concave oil supply surfaces formed on an inner peripheral surface of the bearing hole and arranged dispersively like separated islands, and a sliding surface with an inner diameter Di formed continuous around the oil supply surfaces to hold the shaft; a maximum height difference between the sliding surface and the oil supply surfaces is not less than 0.01% and not more than 0.5% of the inner diameter Di, a surface aperture area ratio of the pores at the sliding surface is not more than 10%, a surface aperture area ratio of the pores at the oil supply surfaces is more than 10% and less than 40%, and an area of each of the oil supply surfaces is not less than 0.03 (mm$^2$) and not more than 0.2×Di$^2$ (mm$^2$).

Since in the oil impregnated sintered bearing the maximum height difference is configured between the sliding surface and the oil supply surfaces to be not less than 0.01% and not more than 0.5% of the inner diameter Di of the sliding surface, the shaft can be held reliably on the sliding surface and the shaft and the oil supply surfaces can be maintained in a state not being in contact with each other. The oil is exuded from the oil supply surfaces having the surface aperture area ratio more than 10% and introduced between the shaft and the sliding surface, so that a sufficient oil film can be formed on the shaft since the sliding surface has the surface aperture area ratio of not more than 10%. Accordingly, in this oil impregnated sintered bearing, it is possible to reduce frictional coefficient by forming the oil film.

In this case, if the surface aperture area ratio holding the shaft is more than 10%, it is not possible to maintain the oil sufficiently because it flows inside the bearing under environment of high speed and high load, the oil film is reduced between the shaft and the sliding surface, seizing is occurred, and a surface pressure resistant property may be deteriorated. If the surface aperture area ratio at the oil supply surfaces is not more than 10%, since it is difficult to supply the oil sufficiently from inside, the oil film between the shaft and the sliding surface is reduced, the seizing is occurred, and the surface pressure resistant property may be deteriorated. If the surface aperture area ratio at the oil supply surfaces is not less than 40%, it is difficult to configure the aperture area ratio at the sliding surface to be not more than 10% by sizing. The surface aperture area ratio is an area ratio of open parts per unit area at the sliding surface or the oil supply surfaces: the value is a mean value in arbitrary view fields (one view field is 1 mm×0.8 mm).

If one area of each of the islands-like oil supply surfaces is less than 0.03 (mm$^2$), the pores contributing to supply oil is not enough and the oil is not supplied sufficiently, the surface pressure resistant property is deteriorated. By contrast, if one area of each of the oil supply surfaces is more than 0.2×Di$^2$ (mm$^2$) to the inner diameter Di (mm) of the sliding surface, the oil supply surfaces are arranged unevenly and the surface pressure resistant property is deteriorated. In the present invention, since the area of each of the island-like oil supply surfaces is not less than 0.03 mm$^2$ and not more than 0.2×Di$^2$ (mm$^2$), the surface pressure resistant property is improved, so that it is possible to use in environment of high speed and high load.

In the oil impregnated sintered bearing of the present invention, it is preferable that an area ratio of the sliding surface to a whole area of the inner peripheral surface of the bearing hole be not less than 0.4 and not more than 0.98. The "whole area of the inner peripheral surface" is a sum total of an area of the sliding surface and an area of the respective oil supply surfaces.

If the area ratio of the sliding surface to the whole inner peripheral surface is less than 0.4, high surface pressure is applied on the sliding surface in a practical size, abrasion of the sliding surface progresses and it is easy to seize. In order to improve the durability of the bearing, it is not practical since it is necessary to enlarge the size of the bearing if the area ratio of the sliding surface is less than 0.4. In a case in which the area ratio of the sliding surface exceeds 0.98, it is not possible to supply the lubricant oil sufficiently, the abrasion of the sliding surface progresses and it is easy to seize.

In the oil impregnated sintered bearing of the present invention, it is preferable that a mean open size of the pores opening at the sliding surface be less than 20 μm.

If the mean open size of the pores opening at the sliding surface is not less than 20 μm, the oil is not sufficiently maintained in the environment of high speed and high load, so that the oil is easy to flow into the bearing; the oil film is reduced between the shaft and sliding surface, seizing is occurred, and the surface pressure resistant property may be deteriorated. The measurement of the mean open size of the pores at the sliding surface is a mean value of arbitrary view fields (one view field is 1 mm×0.8 mm). The mean open size of the pores at the sliding surface is a mean diameter in terms of a circle of the pores measured in the arbitrary view fields (one view field is 1 mm×0.8 mm).

In the oil impregnated sintered bearing of the present invention, the oil supply surfaces may be provided more in both end parts than in a center part of a length direction of the bearing hole.

If the more oil supply surfaces are arranged in the end parts of the bearing hole, the more sliding surfaces are formed at the center part of the bearing hole than in a case in which the oil supply surfaces are distributed evenly at the whole part; as a result, the higher surface pressure resistant property can be obtained for the same area ratio of the sliding surface.

In the oil impregnated sintered bearing of the present invention, the oil supply surfaces be provided more in center part than in both end parts of a length direction of the bearing hole.

If the more oil supply surfaces are arranged in the center part of the bearing hole, in comparison with a case in which the oil supply surfaces are distributed evenly at the whole part, the bearing with the same area ratio of the sliding surface can withstand higher speed.

A method of manufacturing oil impregnated sintered bearing of the present invention includes: a step of forming green compact forming a cylindrical pressured powder body by filling and pressurizing material powder in a cylindrical space between a forming die plate and a forming core rod of a forming die; a step of sintering forming a sintered body by sintering the green compact; and a step of sizing correcting dimensions of the sintered body and forming a bearing hole by pushing and pressurizing the sintered body in a cylindrical space between a sizing die plate and a sizing core rod of a sizing die: in the step of forming green compact, protruded parts are formed on at least a part of an outer peripheral surface of the forming core rod so as to protrude from the other part outward in a radial direction, concave parts arranged dispersively like separated islands and a convex part adjacent and continuous to the concave parts on an inner peripheral surface of the green compact are formed, in the step of sintering, the concave parts are formed into oil supply surfaces having a surface aperture area ratio of more than 10% and less than 40% by sintering the pressured powder body, and in the step of sizing, an outer peripheral surface of the sizing core rod is formed to be larger than an inner diameter of the convex part of the sintered body and smaller than an inner diameter of the concave parts; a sliding surface having a surface aperture area ratio of not more than 10% is formed by compressing the convex part outward in a radial direction by the outer peripheral surface of the sizing core rod; a maximum height difference between the oil supply surfaces and the sliding surface is formed to be not less than 0.01% and not more than 0.5% of an inner diameter of the sliding surface; and an area of each of the oil supply surfaces is made to be not less than 0.03 (mm$^2$) and not more than 0.2×Di$^2$ (mm$^2$) to an inner diameter Di of the bearing hole.

The sintered body in which the concave parts and the convex part are formed is formed by forming concave parts on the inner peripheral surface of the green compact and the convex part continuous around the concave parts in the step of forming the green compact, and the convex part on the inner peripheral surface of the sintered body is compressed and plastically flow by the sizing core rod, so that the sliding surface is formed. At this time, the pores of the convex part is clogged by compressed and plastically flowed, so that a dense layer is formed on a surface of the sliding surface and the surface aperture area ratio of the sliding surface can be reduced. On the other hand, in the step of sintering, the oil supply surfaces formed in the concave parts are not compressed since the maximum height different between the sliding surface and the oil supply surfaces is configured to be at least not less than 0.01% of the inner diameter of the sliding surface, so that a state in which the pores at the oil supply surfaces are exposed, that is, a state in which the surface aperture area ratio exceeds 10% can be maintained.

If the maximum height difference between the sliding surface and the oil supply surfaces is less than 0.01%, the pores are closed also on the oil supply surfaces while sizing the convex part which will be sliding surface, so that there is a risk that sufficient oil supply cannot be maintained. If the maximum height difference between the sliding surface and the oil supply surfaces is more than 0.5%, it takes long time to supply the oil sufficiently to the sliding surface at the time of startup, and the frictional coefficient is large, so that there is a risk that the sliding property of the bearing is deteriorated.

In the method of manufacturing oil impregnated sintered bearing of the present invention, the green compact is formed between the forming die plate and the forming core rod of the forming die and then the restriction by the forming die plate is removed: the green compact springs back to some extent. Accordingly, even though an enlarged diameter part (a protruded part) is formed to be protruded (radially widened) outward in the radial direction from the other part on the outer peripheral surface of the forming core rod, if the convex dimension is small, it is possible to easily extract the green compact from the forming core rod by a gap generated between the forming core rod. The green compact in which the concave parts and the convex part are formed as above-mentioned is sintered, and the convex part on the inner peripheral surface of the sintered body is compressed to clog the pores on the convex part: as a result, it is possible to form the sliding surface in which the surface aperture area ratio is decreased and to maintain the oil supply surfaces in which the surface aperture area ratio is increased on the concave parts which are not compressed.

As described above, in the method of manufacturing oil impregnated sintered bearing of the present invention, without increasing processes, it is possible to manufacture the oil impregnated sintered bearing having the sliding surface with the surface aperture area ratio of not more than 10% and the oil supply surfaces with the surface aperture area ratio more than 10% and less than 40% on the inner peripheral surface of the bearing hole by the usual processes, i.e., the step of forming green compact, the step of sintering and the step of sizing.

Advantageous Effects of Invention

According to the present invention, the oil is exuded from the oil supply surfaces with the surface aperture area ratio more than 10% and less than 40% and introduced between the shaft and the sliding surface with the surface aperture area ratio no more than 10%: so that it is possible to supply sufficient amount of oil to the sliding surface and restrict the supplied oil from moving to inside the bearing from the sliding surface. Thereby the oil film can be formed on the shaft, the frictional coefficient can be reduced and the sliding property as bearings can be improved. Moreover, since the oil supply surfaces are distributed as separated islands, it is possible to use under environment of high speed and high load.

DETAILED DESCRIPTION OF THE INVENTION

The first to third embodiments of an oil impregnated sintered bearing and a method of manufacturing the same of the present invention will be explained below.

Figure 1:
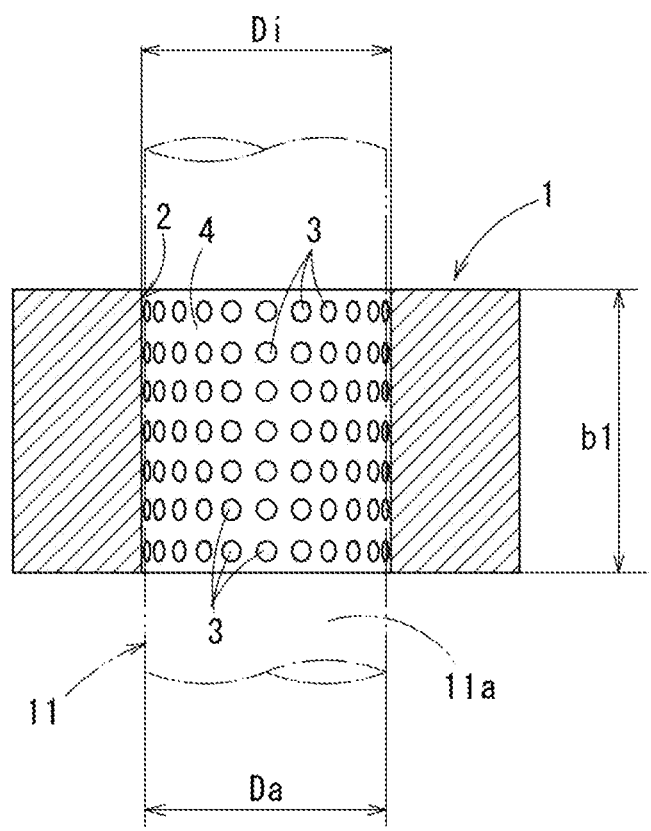
FIG. 1 is a vertical cross sectional view of an oil impregnated sintered bearing through an axis thereof according to a first embodiment of the present invention.
Figure 2:
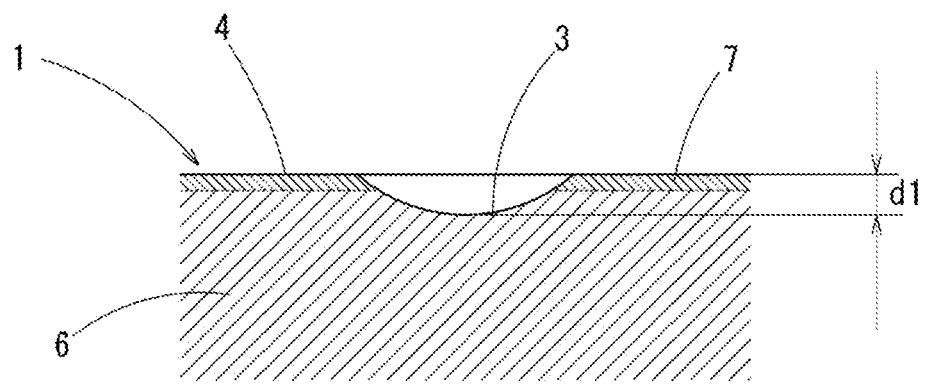
FIG. 2 is an enlarged sectional view around oil supply surfaces of a bearing hole in the oil impregnated sintered bearing of FIG. 1.

An oil impregnated sintered bearing 1 of the first embodiment is a cylindrical bearing formed from a sintered body of metal powder: as shown in FIG. 1 and FIG. 2, concave oil supply surfaces 3 arranged to be distributed as islands on an inner peripheral surface of a bearing hole 2 are formed; and a sliding surface 4 holding an outer peripheral surface 11a of a shaft 11 is formed continuous to around the oil supply surfaces 3.

The bearing hole 2 holds the inserted shaft 11 rotatably: the concave-surface oil supply surfaces 3 formed by denting a part of the inner peripheral surface of the bearing hole 2 are formed to be studded on the sliding surface 4. An area of each of the oil supply surfaces 3 is not less than 0.03 (mm²), and is not less than $0.2 \times Di^2$ (mm²), with respect to an inner diameter Di (mm) of the sliding surface 4.

The oil supply surfaces 3 are formed on parts which are concave in a spherical cap shape. In a vertical cross section shown in FIG. 2, an outer edge of the concave part is on an inner edge of a surface layer part being the sliding surface 4, so that a surface of a center part except for the outer edge of the concave part is the oil supply surface 3. If the area of each of the oil supply surfaces 3 is less than 0.03 (mm²), fewer pores contribute to supply oil and the oil is not sufficiently supplied, so that a surface pressure resistance property is deteriorated. If the area of each of the oil supply surfaces 3 is more than $0.2 \times Di^2$ (mm²) with respect to the inner diameter Di (mm) of the sliding surface 4, the bias of distribution of the oil supply surfaces 3 becomes large, so that the surface pressure resistance property is deteriorated.

In an example shown in FIG. 1, the oil supply surfaces 3 are formed in a circular shape in frontal view and distributed almost evenly on an entire surface of the inner peripheral surface of the bearing hole 2 of the oil impregnated sintered bearing 1.

The sliding surface 4 is formed by a surface of the inner peripheral surface of the bearing hole 2 except for the oil supplying surfaces 3, and formed with slightly the larger diameter Di than an outer diameter Da of the shaft 11. For example, the inner diameter Di of the sliding surface 4 is formed to be not less than 1 mm and not more than 30 mm: a gap of not less than 0.05% and not more than 0.6% of the inner diameter Di of the sliding surface 4 is formed between the sliding surface 4 and the shaft 11.

A maximum height difference d1 between the sliding surface 4 and the oil supply surfaces 3 is not less than 0.01% and not more than 0.5% of the inner diameter Di of the sliding surface 4.

Since the oil impregnated sintered bearing 1 is formed of a sintered body of metal powder, it is a porous body 6 in which pores are formed inside: the pores open at the oil supply surfaces 3 at the inner peripheral surface of the bearing hole 2. A surface aperture area ratio of the pores at the oil supply surfaces 3 is more than 10% and less than 40%.

The sliding surface 4 is formed from a dense layer 7 in which the pores are treated to be closed as shown in FIG. 2. The surface aperture area ratio of the pores at the surface of the sliding surface 4 is not more than 10%; preferably not more than 5%; more preferably not more than 3%. The surface aperture area ratio of the pores is an area ratio of open parts of the pores per unit area at the inner peripheral surface of the bearing hole 2.

When an area ratio of the sliding surface 4 is "a" with respect to the whole area of the inner peripheral surface of the bearing 2, the area ratio "a" is not less than 0.4 and not more than 0.98. In this case, when a length of the bearing hole 2 is "b1" (which is same as a length "b1" of the oil impregnated sintered bearing 1 in the present embodiment), when the shaft is inserted into the bearing hole 2 and in contact with the inner peripheral surface, a region of (a×100) % of the length "b1" of the bearing hole 2 is in contact with the sliding surface 4. "The whole area of the inner peripheral surface" is a sum of the area of the sliding surface 4 and the area of the respective oil supply surfaces 3.

Next, a method of manufacturing the impregnated oil sintered bearing 1 will be explained.

The method of manufacturing the oil impregnated sintered bearing 1, as shown in a flow drawing of FIG. 2, includes a step of forming green compact (S1) to form a cylindrical green compact by filling material powder in a forming die and pressurizing it; a step of sintering (S2) to form a sintered body by sintering the green compact; and a step of sizing (S3) to form a bearing hole by pressurizing the sintered body in a sizing die after the step of sintering (S2) to correct a size thereof.

The material powder of the oil impregnated sintered bearing 1 is not specifically limited though, copper type powder or iron copper type powder is suitable.

The copper type powder is copper powder containing copper alloy such as copper-tin, copper-tin-phosphorus, copper-zinc or the like as main component. It is applicable to contain low melting metal powder (e.g., tin powder) having a melting point of not more than sintering temperature with 5 to 12% by mass or solid lubricant such as graphite or the like with 0.5 to 9% by mass.

The iron copper type powder contains 15 to 80% by mass of copper powder and the balance iron powder: it may contain 0.1 to 5% by mass of low melting metal powder and 0.5 to 5% by mass of solid lubricant.

A shape of the copper powder contained in the material powder is not necessarily limited though, it is preferable to use two type, flattened powder and granular powder. Electrolytic copper powder or atomized copper powder is used for the granular powder. The flattened powder has an aspect rate (a diameter/a thickness) of not less than 10: copper flakes can be used, for example. A mixture ratio of the flattened powder in the copper powder is preferably 5% by mass to 30% by mass in a case of the copper type powder: preferably 5% by mass to 60% by mass in a case of iron copper type powder. Regarding the granular powder and the flattened powder of the copper type powder, for example, a maximum diameter of the flattened powder is not less than 1 μm and not more than 200 μm: the granular powder is formed to have a mean grain size of not less than 5 μm and not more than 100 μm. In the iron copper type powder, a mean grain size of the iron powder is formed to be the same as or larger than the mean grain size of the copper powder in the copper type powder.

Figure 5:
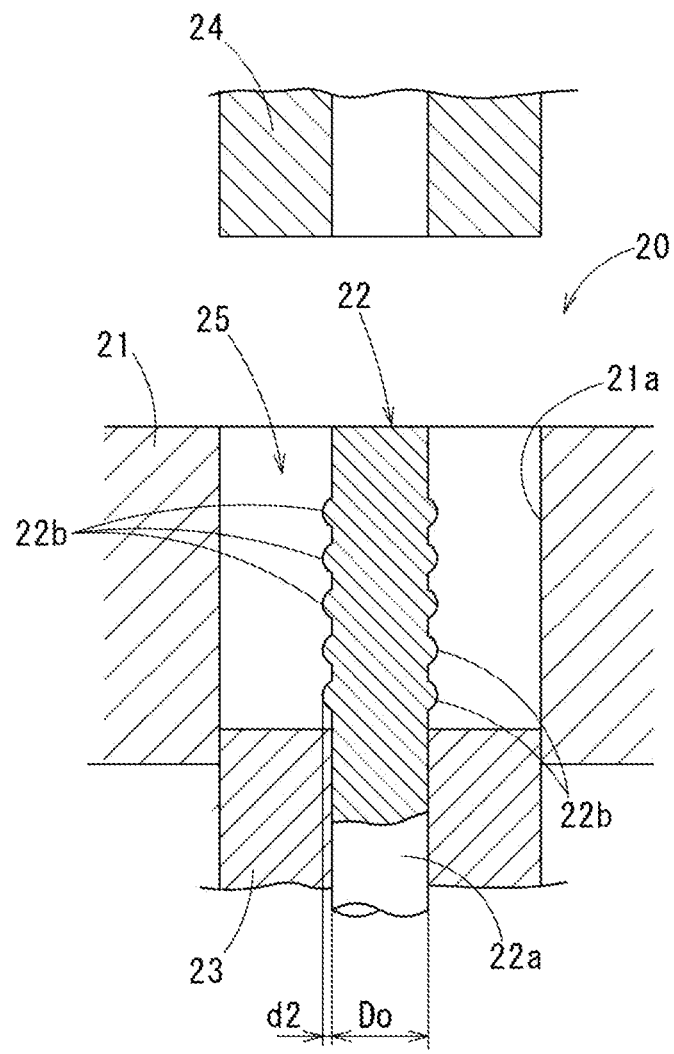
FIG. 5 is a vertical cross sectional view schematically showing inside a forming die.
Figure 6:
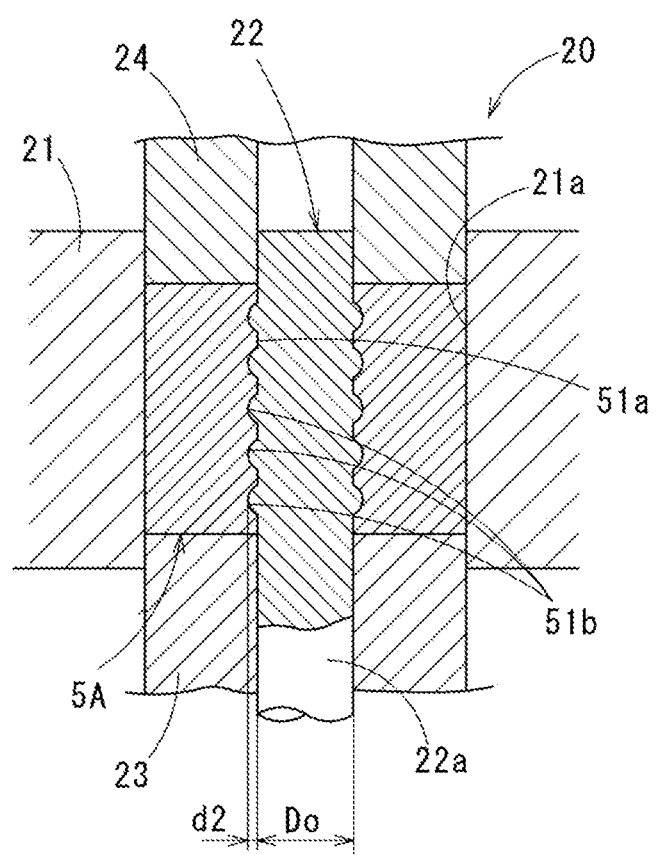
FIG. 6 is a vertical cross sectional view showing a step of forming a green compact forming a green compact by the forming die shown in FIG. 5.
Figure 7:
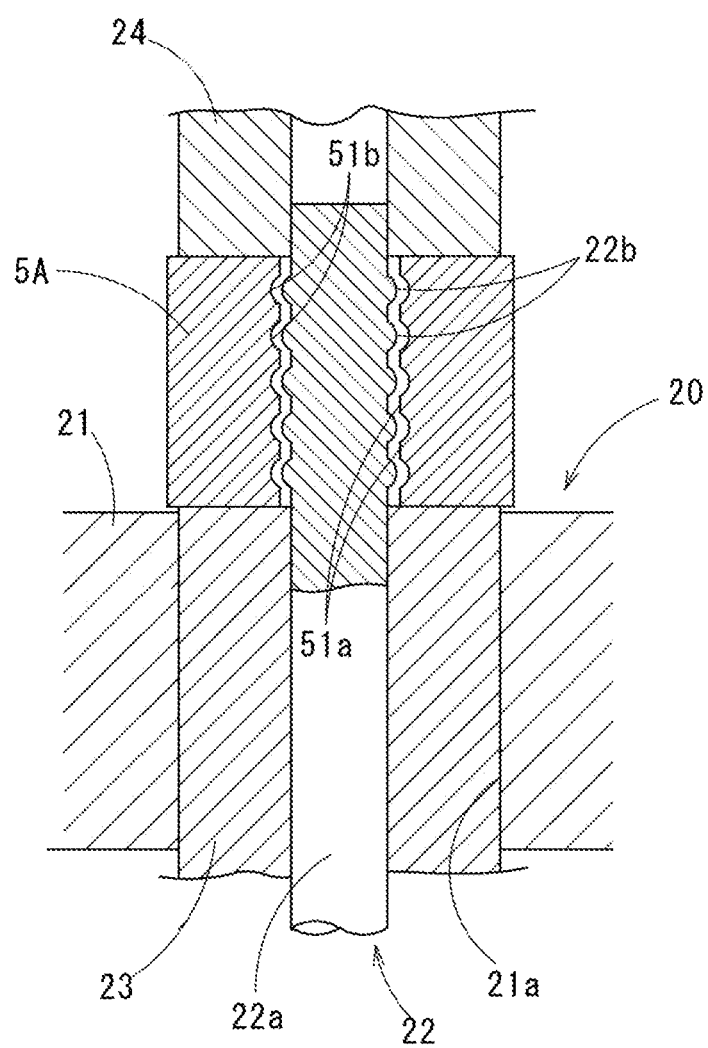
FIG. 7 is a vertical cross sectional view schematically showing a state in which the green compact is extract by moving a forming die plate upward from a state shown in FIG. 6.

In the step of forming green compact (S1), as shown in FIG. 5 to FIG. 7, a forming die 20 provided with a forming die plate 21, a forming core rod 22, a forming lower punch 23 and a forming upper punch 24 is used. A cylindrical through hole 21a is formed in the forming die plate 21. The forming core rod 22 inserted in a center of the through hole 21a is formed to be a cylindrical shape as a whole: on a part of an outer peripheral surface 22a contributing to a formation of an inner peripheral surface of the green compact, protruded parts 22b projecting outward in a radial direction than the other parts are formed to be distributed as islands. A maximum height difference d2 between the outer peripheral surface 22a and the protruded parts 22b is not less than 0.1% and not more than 1.0% of an outer diameter Do of the outer peripheral surface 22a. The protruded parts 22b are formed to have a circular shape with the same size in a frontal view and arranged distributing with a prescribed interval.

The forming lower punch 23 is formed cylindrically and inserted between the through hole 21a of the forming die plate 21 and the outer peripheral surface 22a of the forming core rod 22 from a lower side. A cylindrical space 25 is formed as shown in FIG. 5 by the forming die plate 21, the forming core rod 22 and the forming lower punch 23.

Figure 3:
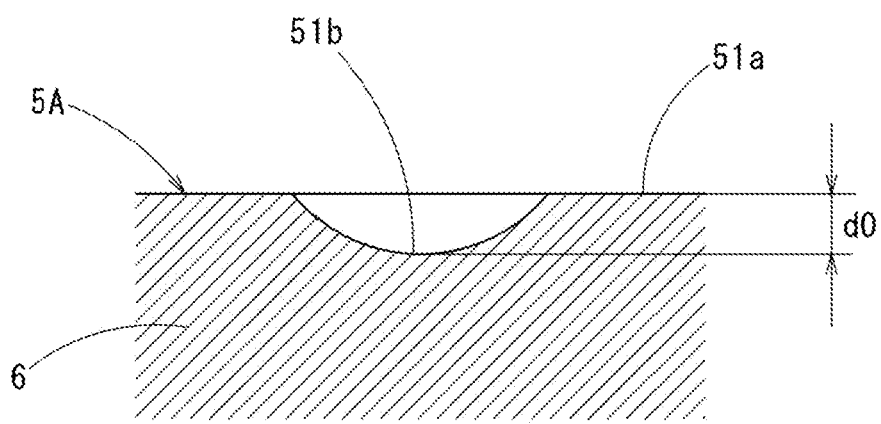
FIG. 3 is an enlarged sectional view showing a state before sizing of a part of FIG. 2.
Figure 4:
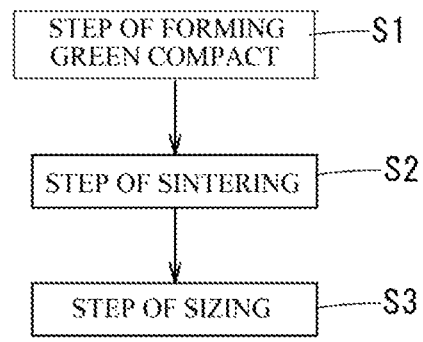
FIG. 4 is a process drawing showing a method of manufacturing the oil impregnated sintered bearing of the first embodiment of the present invention.

Into the cylindrical space 25 formed by the forming die plate 21, the forming core rod 22 and the forming lower punch 23, the material powder of a prescribed amount is charged from an upper side; the material powder is pressurized at 150 to 500 MPa by inserting the cylindrical forming upper punch from the upper side and narrowing the gap between the forming lower punch 23 and the forming upper punch 24, so that a green compact 5A is formed as shown in FIG. 6. At this time, on the inner peripheral surface of the green compact 5A, concave parts 51b dented outward in the radial direction than the other part are formed distributed like islands by the protruded parts 22b of the forming core rod 22 as shown in FIG. 3, and also a convex part 51a adjacent to the concave parts 51b is formed continuously. That is to say, on the inner peripheral surface of the green compact 5A, the convex part 51a and the concave parts 51b with the maximum height difference (not less than 0.1% and not more than 1.0% of the inner diameter of the convex part 51a) are adjacently formed corresponding to the shape of the outer peripheral surface 22a and the protruded part 22b of the forming core rod 22.

After forming the green compact 5A between the forming die plate 21 and the forming core rod 22, as shown in FIG. 7, the forming die plate 21 is moved downward relatively to the forming core rod 22 and the punches 23 and 24 so as to remove the restriction by the forming die plate 21 (decompression): the green compact 5A slightly springs back, so that a gap is generated between the forming core rod 22 and the green compact 5A. In this state, by moving the forming die plate 21 upward to return to an initial position, it is possible to pull the forming core rod 22 out easily from the inside of the green compact 5A (mold release).

On the outer peripheral surface 22a of the forming core rod 22, the protruded part 22b protruding from the other part is formed: the protruding amount (the maximum height difference d2) is small, and the green compact 5A can be easily pulled out from the forming core rod 22 (mold release) by the gap of the forming core rod 22 generated by the spring back of the green compact 5A. The maximum height difference between the convex part 51a and the concave parts 51b of the green compact 5A is slightly larger than restricted by the forming die plate 21 because of the spring back: the inner diameter of the convex part 51a is also slightly larger than restricted by the forming die plate 21.

In the step of forming green compact (S1), the flattened copper powder is gathered on inner peripheral surface of the forming die plate 21 and the outer peripheral surface of the forming core rod 22 of the die forming the cylindrical green compact 5A; a large amount of the flattened powder is arranged along the inner peripheral surface and the outer peripheral surface of the cylindrical green compact 5A. Accordingly, in a case of the iron copper type powder, copper is rich on respective surface layers of the inner peripheral surface and the outer peripheral surface of the cylindrical green compact 5A.

Next, in the step of sintering (S2), by sintering the green compact 5A at temperature of 800 to 950° C., a sintered body 5B having a surface aperture area ratio more than 10% and less than 40% is formed. In the step of sintering (S2), a convex part 52a is formed on an inner peripheral surface of the sintered body 5B at a part of the convex part 51a of the green compact 5A; and concave parts 52b are formed at the concave parts 51b of the green compact 5A.

In the concave parts 52b of the sintered body 5B, the oil supply surfaces 3 having a surface aperture area ratio more than 10% and less than 40% are formed. Dimension of the green compact 5A in the step of forming green compact (S1) is configured so that a maximum height difference d0 between the convex part 52a and the concave parts 52b (the oil supply surfaces 3) in the sintered body 5B is not less than 0.1% and not more than 1.0% of the inner diameter of the convex part 52a, and so that an area ratio of the convex part 51a is not less than 0.4 and not more than 0.98 in the inner peripheral surface of the sintered body 5B.

Figure 8:
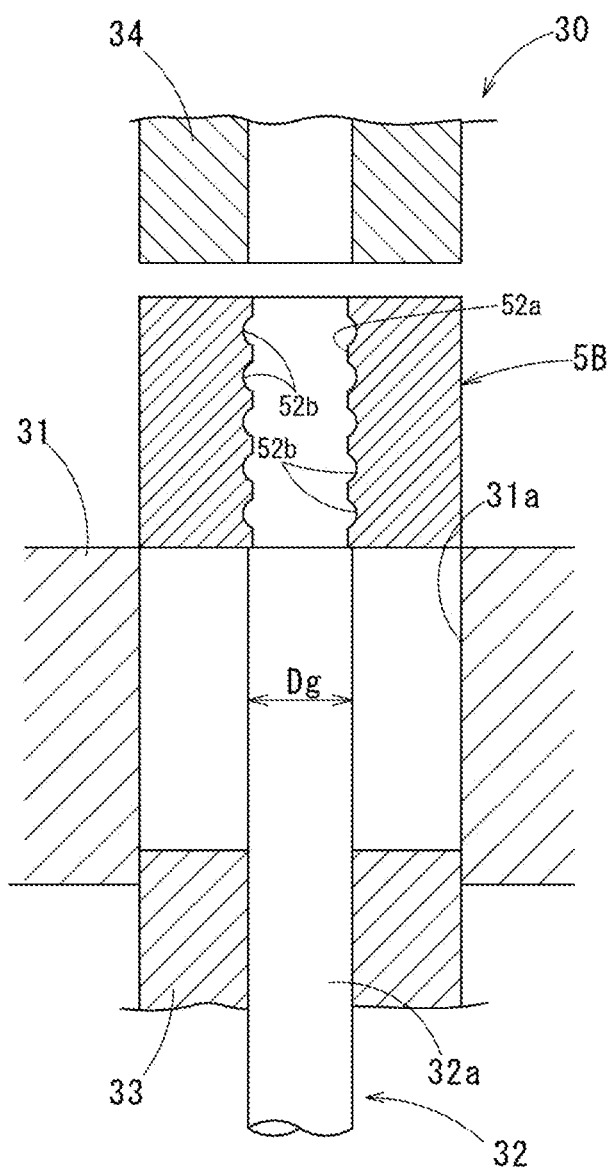
FIG. 8 is a vertical cross sectional view schematically showing a state in which a sintered body is disposed on a sizing die.
Figure 9:
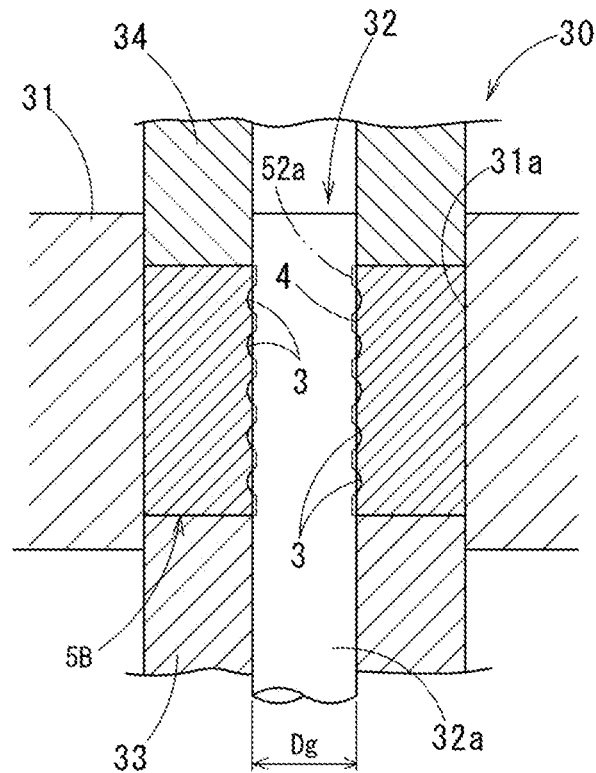
FIG. 9 is a vertical cross sectional view schematically showing a step of sizing for sizing the sintered body.

After the step of sintering (S2), in the step of sizing (S3), the sintered body 5B is corrected in size by a sizing die 30 shown in FIG. 8 and FIG. 9. At this time, by pressurizing the convex part 52a on the inner peripheral surface of the sintered body 5B outward in the radial direction, the sliding surface 4 is formed so that the oil impregnated sintered bearing 1 provided with the oil supply surfaces 3 and the sliding surface 4 is manufactured.

The sizing die 30 corrects the size of the inner and outer diameters of the sintered body 5B and is provided with a sizing die plate 31, a sizing core rod 32, a sizing lower punch 33 and a sizing upper punch 34 as in the forming die 20, as shown in FIG. 8. A surface (an inner peripheral surface) of a through hole 31a of the sizing die plate 31, an outer peripheral surface 32a of the sizing core rod 32, an end surface of the sizing lower punch 33 and an end surface of the sizing upper punch 34, which are in contact with the sintered body 5B, are finished to be smooth surfaces. An outer diameter Dg of the outer peripheral surface 32a of the sizing core rod 32 is larger than the inner diameter of the convex part 52a of the sintered body 5B and smaller than an inner diameter formed by the oil supply surfaces 3 which are dent surfaces.

As shown in FIG. 8, in a state of the sizing die 30 in which the sizing core rod 32 is disposed inside the through hole 31a of the sizing die plate 31, the sintered body 5B is disposed on the sizing die plate 31 and the sizing upper punch 34 is moved downward: the sintered body 5B is press-inserted in a cylindrical space between the through hole 31a of the sizing die plate 31 and the sizing core rod 32: as shown in FIG. 9, the sizing core rod 32 is pressed on the inner peripheral surface of the sintered body 5B. As a result, the sintered body 5B is compressed and plastically flowed in the radial direction and an axis direction between the inner peripheral surface of the through hole 31a of the sizing die plate 31 and the outer peripheral surface 32a of the sizing core rod 32, and between the sizing upper punch 34 and the sizing lower punch 33, so that a shape of the sintered body 5B is finished to be a product size. Especially in a case of the iron copper type material, in the sintered body 5B in which the surface layer parts on the inner peripheral surface and the outer peripheral surface are formed rich in copper by the flattened copper powder, the soft part where copper is rich at the surface layer parts is easily plastically flowed in the step of sizing: so that surface open parts are easily collapsed at parts on which the sizing die 30 is rubbed.

The outer diameter Dg of the outer peripheral surface 32a of the sizing core rod 32 is larger than the convex part 52a of the sintered body 5B and smaller than a maximum diameter of the oil supply surfaces 3 which are concave parts. Accordingly, in the step of sizing (S3), the oil supply surfaces 3 on the inner peripheral surface of the sintered body 5B is not compressed, and the convex part 52a only is compressed and plastically flowed outward in the radial direction. The convex part 52a of the sintered body 5B is compressed by the outer peripheral surface 32a of the sizing core rod 32; and the outer peripheral surface 32a of the sizing core rod 32 is slid on the convex part 52a: the pores opening at the surface of the convex part 52a are closed, the dense layer 7 (refer to FIG. 2) in a state in which the pores are closed is formed on the whole surface of the convex part 52a, so that the sliding surface 4 with the surface aperture ratio of not more than 10% is formed. As a result, the oil impregnated sintered bearing 1 is manufactured to have the sliding surface 4 and the oil supply surfaces 3 with the maximum height difference d1 which is not less than 0.01% and not more than 0.5% of the inner diameter Di of the sliding surface 4.

In this case, the sliding surface 4 is formed on the whole surface of the convex part 52a of the sintered body 5B; the area ratio "a" of the sliding surface 4 to the area of the whole inner peripheral surface of the bearing hole 2 of the oil impregnated sintered bearing 1 is configured to be not less than 0.4 and not more than 0.98. Lubricant oil is impregnated into the oil impregnated sintered bearing 1 at the end.

The oil impregnated sintered bearing 1 has the inner peripheral surface as the bearing hole 2 and holds the shaft 11 inserted therein rotatably. On the inner peripheral surface of the bearing hole 2, the oil supply surfaces 3 are formed dispersively like separated islands: the other surface than the oil supply surfaces 3 is the sliding surface holding the shaft 11. Between the deepest part of the oil supply surfaces 3 and the outer peripheral surface of the shaft 11, a larger gap than the maximum height difference d1 between the oil supply surfaces 3 and the sliding surface 4 is formed. The surface aperture area ratio of the pores at the sliding surface 4 is made small by the dense layer 7 to be not more than 10% as described above: the surface aperture area ratio of the pores at the oil supply surfaces 3 is larger than the surface aperture area ratio of the sliding surface 4, more than 10% and less than 40%.

Accordingly, when the shaft 11 is rotated, oil is exuded from the oil supply surfaces 3 having the large surface aperture area ratio and supplied between the shaft 11 and the sliding surface 4. Since the surface aperture area ratio of the sliding surface 4 is small as not more than 10%, the oil is not impregnated inside and forms oil film between the sliding surface 4 and the shaft 11 to hold the shaft 11. In this case, if the surface aperture area ratio of the sliding surface 4 is more than 10%, the oil flows inside the bearing so that an oil holding property is deteriorated, the oil film is reduced between the shaft 11 and the sliding surface 4, and seizing may be occurred. If the surface aperture area ratio of the oil supply surfaces 3 is not more than 10%, it is difficult to sufficiently supply the oil to the sliding surface 4 from inside.

In this embodiment, since the sufficient oil is supplied between the sliding surface 4 and the shaft 11, the frictional resistance is reduced by the oil film, and the sliding property can be improved.

The area of each of the island-like oil supply surfaces 3 is not less than 0.03 mm$^2$ and not more than $0.2 \times Di^2$ (mm$^2$) to the inner diameter Di (mm) of the sliding surface 4. If the area of each of the oil supply surfaces 3 is less than 0.03 mm$^2$, the fewer pores distributes to supply oil so that the oil is not sufficiently supplied: as a result, the surface pressure resistant property is deteriorated. By contrast, if the area of each of the oil supply surfaces 3 is more than $0.2 \times Di^2$ (mm$^2$) to the inner diameter Di (mm) of the sliding surface 4, the bias of distribution of the oil supply surfaces 3 becomes large, so that the surface pressure resistance property is deteriorated. In the present invention, one area of the island-like oil supply surfaces 3 is not less than 0.03 (mm$^2$) and not more than $0.2 \times Di^2$ (mm$^2$) to the inner diameter Di (mm) of the sliding surface 4, so that the surface pressure resistant property is improved and it is possible to use under environment of high speed and high load.

If the maximum height difference d1 between the sliding surface 4 and the oil supply surfaces 3 is less than 0.01% of the inner diameter Di of the sliding surface 4, the pores of the oil supply surfaces 3 are also closed when the convex part 51a which will be the sliding surface 4 is sized, so that there is a case of not supplying sufficient oil. If the maximum height difference d1 between the sliding surface 4 and the oil supply surfaces 3 is more than 0.5%, it takes long time for supplying oil sufficiently to the sliding surface 4 when starting, so that the frictional coefficient is increased and the sliding property of the oil impregnated sintered bearing 1 may be deteriorated.

In the oil impregnated sintered bearing 1, the sliding surface 4 and the oil supply surfaces 3 distributed like islands are formed adjacently on the inner peripheral surface of the bearing hole 2 in the axis direction and the area ratio "a" of the sliding surface 4 is not less than 0.4 and not more than 0.98. Therefore, even when the shaft 11 is in contact with anywhere on the inner peripheral surface of the bearing hole 2, it is in contact with the sliding surface 4 within a range of (a×100) % of the length b1 of the bearing hole 2, so that the shaft 11 can be held stably. In the oil impregnated sintered bearing 1, since the oil supply surfaces 3 are formed between the sliding surface 4; that is to say, since the sliding surface 4 is formed on both sides of the oil supply surfaces 3, the oil can be supplied efficiently to the sliding surface 4 from the oil supply surfaces 4, and it is possible to reduce the loss by flowing out to the end surface of the oil impregnated sintered bearing 1. Accordingly, by synergism of these, the oil film is reliably prevented from shortage, the oil impregnated sintered bearing 1 can show the good sliding property for long term.

Figure 10:
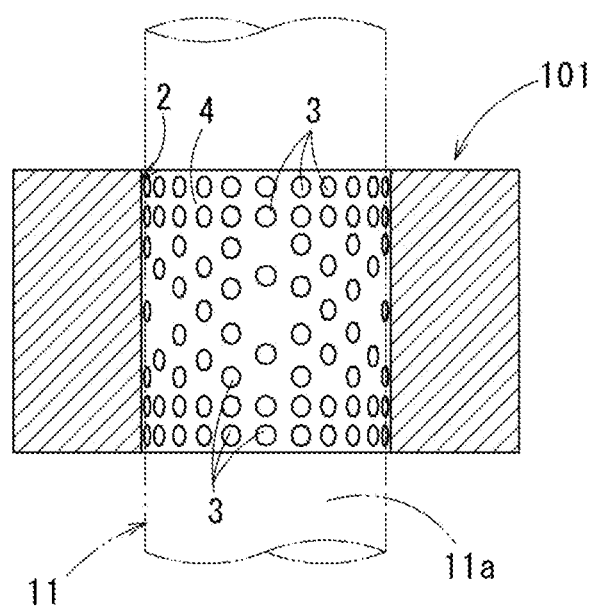
FIG. 10 is a vertical cross sectional view through an axis of an oil impregnated sintered bearing of a second embodiment of the present invention.
Figure 11:
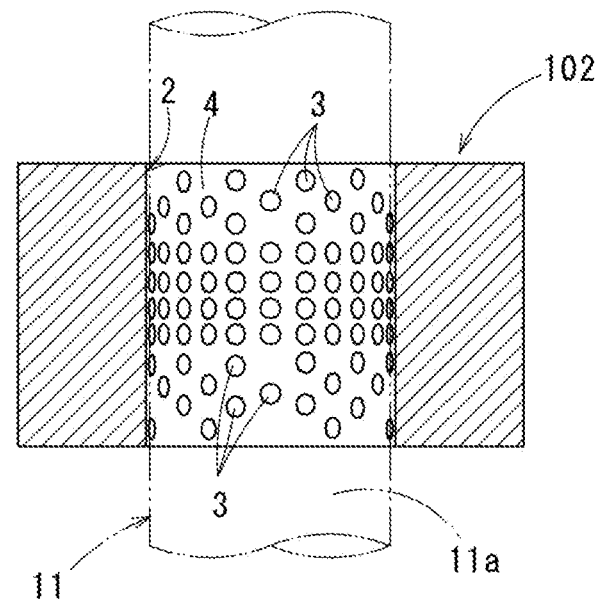
FIG. 11 is a vertical cross sectional view through an axis of an oil impregnated sintered bearing of a third embodiment of the present invention.

In the first embodiment, the oil supply surfaces 3 are distributed substantially evenly on the whole of the bearing hole 2: as in the second embodiment shown in FIG. 10 or the third embodiment shown in FIG. 11, a degree of distribution of the oil supply surfaces 3 may be different between a center part and both end parts in a longitudinal direction of the bearing hole 2.

The sizes of the respective oil supply surfaces 3 in the second embodiment and the third embodiment are the same as in the first embodiment. In an oil impregnated sintered bearing 101 of the second embodiment, it is more distributed in both the end parts than the center parts in the longitudinal direction of the bearing hole 2. In an oil impregnated sintered bearing 102 of the third embodiment, it is more distributed in the center parts in the longitudinal direction of the bearing hole 2 than both the end parts.

In the second embodiment shown in FIG. 10, since the area of the sliding surface 4 per unit area in the inner peripheral surface of the bearing hole 2 is larger in the center part than in the end parts, if the area ratio of the sliding surface is the same, a higher surface pressure resistant property is shown in comparison with a case in which the oil supply surfaces 3 are evenly distributed.

In the third embodiment shown in FIG. 11, since the area of the sliding surface 4 per unit area in the inner peripheral surface of the bearing hole 2 is larger in the end parts than in the center part, if the area ratio of the sliding surface is the same, the shaft can resist high speed in comparison with a case in which the oil supply surfaces 3 are evenly distributed.

The present invention is not limited to the above-described embodiments and various modifications may be made without departing from the scope of the present invention.

For example, the oil supply surfaces 3 are configured to have the same area in the illustrated examples though, it may be applicable to distribute the oil supply surfaces 3 having different areas. Moreover, the oil supply surfaces 3 are illustrated as being in a row in the axis direction (the longitudinal direction); the arrangement may be in zigzag, in a spiral around an axis of the bearing hole 2, or at random.

The shape of the oil supply surfaces 3 may be arbitrary such as a square, a rectangle, a rhombus, a triangle and the like other than the circle as illustrated. Also a sectional shape of the oil supply surfaces 3 may be a trapezoid gradually enlarged toward the sliding surface 4 from the oil supply surfaces 3 or a rectangle, other than the spherical cap shape shown in FIG. 2.

Examples

Test results carried out for demonstrating effects of the present invention will be explained.

For tests, iron copper type powder in which iron, copper, tin, graphite and the like are mixed was used as material powder. The material powder consisting of iron copper type powder was prepared from: 50% by mass of copper powder, 2% by mass of tin powder, 5% by mass of copper-8% by mass phosphorus powder, 10% by mass of copper-zinc powder, 0.5% by mass of solid lubricant such as graphite, and iron powder as the balance. Regarding the copper powder among them, a mixture of the flattened powder having the aspect ratio of not less than 10 and a maximum diameter of not less than 1 μm and not more than 100 μm and the granule powder having the mean grain size of not less than 5 μm and not more than 100 μm was prepared: a mixed ratio of the flattened powder in the copper powder was 25% by mass. The mean grain size of the iron powder was equal to or greater than the mean grain size of the granule powder in the copper powder.

The green compact was formed by pressurize-forming the material powder at 150 to 500 MPa in the step of forming green compact; then the sintered body was formed to have the convex part and the oil supply surfaces with the maximum height difference d0 on the inner peripheral surface by sintering at temperature 800 to 950° C. in the step of sintering; and after the step of sizing, the oil impregnated sintered bearing (hereinafter, omitted as the bearing) was formed to have the sliding surface and the oil supply surfaces with the maximum height difference d1 on the inner peripheral surface of the bearing hole. The oil supply surfaces were formed with the area per one oil supply surface, number and the maximum height difference (depth) d1 shown in Table 1. The sliding surface was formed on the other part on the inner peripheral surface of the bearing hole excepting the oil supply surfaces. The area ratio "a" of the sliding surface was shown in Table 1. The length b1 of the bearings was 8 mm. The inner diameter Di of the sliding surface was 8 mm. The whole inner peripheral surface of the bearing hole of Sample No. 16 was the sliding surface: the whole inner peripheral surface was the oil supply surface in Sample No. 17.

In Table 1, the maximum height difference d1 was described by a ratio to the inner diameter Di of the sliding surface. The maximum height difference d0 of the sintered body before sizing was also denoted by a ratio to the inner diameter formed by the convex part.

The area ratio "a" of the sliding surface to the whole inner peripheral surface of the bearing hole and the maximum height difference d1 between the sliding surface and the oil supply surfaces in Table 1 were measured at the inner peripheral surface by a contracer (a shape measurement device).

The surface aperture area ratio of the sliding surface and the oil supply surfaces and a mean opening size of pores opening at the sliding surface were obtained by: taking SEM images (SEI) with a magnification of 500; extracting the opening parts by binarizing the photographs by an image analysis software; and calculating the area ratio of the open parts and the size of the pores. Five test pieces (bearings) were prepared for the respective bearings with different conditions, for the measurement of the area ratio of the opening parts and the mean opening size of the pores. Five viewing fields were taken for the images of the area ratio of the open parts, with respect to the sliding surface and the oil supply surfaces of the respective bearings. The surface aperture area ratio and the mean opening size of the pores were obtained as the mean value of the respective measuring results of 25 images. In a case in which one oil supply surface was smaller than the observation viewing field, the measurement was carried out on only the oil supply surface in this viewing field: the measurements were carried out at more measurement viewing field as necessary, so that the measurement area was to be equal.

After the obtained bearing was impregnated with the lubricant oil, the shaft was inserted into the bearing hole, and rotated in a state in which a load surface pressure shown in Table 2 was added in a vertical direction perpendicular to the axis. Then the durability of the bearing was evaluated. The durability of the bearing was evaluated as "B" (fail) if the shaft and the bearing seized or as "A" (pass) if no seizing occurred, after rotation at rotation speed of 10,000 (rpm) for 30 minutes.

TABLE 1

| No. | AREA PROPORTION OF SLIDING SURFACE "a" | HEIGHT DIFFERENCE d0 (%) | OIL SUPPLY SURFACE | | | SURFACE OPEN PROPORTION (%) | | PORES OF SLIDING SURFACE |
|---|---|---|---|---|---|---|---|---|
| | | | AREA PER ONE mm² | NUMBER | HEIGHT DIFFERENCE d1 (%) | SLIDING SURFACE | OIL SUPPLY SURFACE | MEAN SIZE (μm) |
| 1 | 0.90 | 0.5 | 0.5 | 40 | 0.1 | 3 | 25 | 10 |
| 2 | 0.97 | 0.1 | 0.03 | 200 | 0.05 | 9 | 16 | 15 |
| 3 | 0.60 | 0.5 | 5 | 16 | 0.35 | 8 | 17 | 14 |
| 4 | 0.85 | 0.3 | 1 | 30 | 0.1 | 5 | 25 | 13 |
| 5 | 0.60 | 0.3 | 1 | 80 | 0.2 | 7 | 18 | 14 |

TABLE 1-continued

| No. | AREA PROPORTION OF SLIDING SURFACE "a" | HEIGHT DIFFERENCE d0 (%) | OIL SUPPLY SURFACE AREA PER ONE mm² | NUMBER | HEIGHT DIFFERENCE d1 (%) | SURFACE OPEN PROPORTION (%) SLIDING SURFACE | OIL SUPPLY SURFACE | PORES OF SLIDING SURFACE MEAN SIZE (μm) |
|---|---|---|---|---|---|---|---|---|
| 6 | 0.51 | 0.8 | 3 | 33 | 0.5 | 5 | 30 | 12 |
| 7 | 0.75 | 0.5 | 1.2 | 42 | 0.35 | 8 | 25 | 16 |
| 8 | 0.70 | 0.3 | 2 | 30 | 0.25 | 9 | 18 | 16 |
| 9 | 0.48 | 0.2 | 8 | 13 | 0.02 | 5 | 16 | 14 |
| 10 | 0.44 | 0.9 | 12.5 | 9 | 0.1 | 8 | 35 | 15 |
| 11 | 0.49 | 0.4 | 6 | 17 | 0.3 | 8 | 16 | 15 |
| 12 | 0.44 | 0.2 | 2.8 | 40 | 0.1 | 8 | 17 | 16 |
| 13 | 0.25 | 0.3 | 5 | 30 | 0.1 | 2 | 18 | 11 |
| 14 | 0.99 | 0.3 | 0.03 | 67 | 0.1 | 5 | 25 | 14 |
| 15 | 0.51 | 0.8 | 3 | 33 | 0.5 | 5 | 30 | 25 |
| 16 | 1 | — | — | — | 0 | 6 | — | 15 |
| 17 | 0 | — | — | — | 0 | — | 18 | — |
| 18 | 0.51 | 0.3 | 3 | 30 | 0.1 | 20 | 45 | 18 |
| 19 | 0.51 | 0.7 | 3 | 33 | 0.65 | 11 | 18 | 17 |
| 20 | 0.97 | 0.3 | 0.02 | 300 | 0.1 | 7 | 17 | 14 |
| 21 | 0.55 | 0.3 | 30 | 3 | 0.1 | 6 | 18 | 13 |

TABLE 2

| No. | DURABILITY 2.5(MPa) | 5.0(MPa) | 6.5(MPa) |
|---|---|---|---|
| 1 | A | A | A |
| 2 | A | A | A |
| 3 | A | A | A |
| 4 | A | A | A |
| 5 | A | A | A |
| 6 | A | A | A |
| 7 | A | A | A |
| 8 | A | A | A |
| 9 | A | A | A |
| 10 | A | A | A |
| 11 | A | A | A |
| 12 | A | A | A |
| 13 | A | A | B |
| 14 | A | A | B |
| 15 | A | A | B |
| 16 | B | B | B |
| 17 | B | B | B |
| 18 | B | B | B |
| 19 | A | B | B |
| 20 | A | B | B |
| 21 | A | B | B |

From the results in Table 1 and Table 2, regarding Nos. 1 to 15 in which the maximum height difference d1 between the sliding surface and the oil supply surfaces was not less than 0.01% and not more than 0.5% of the inner diameter Di of the sliding surface, the surface aperture area ratio of the sliding surface was not more than 10%, the surface aperture area ratio of the oil supply surfaces was more than 10% and less than 40%, and the area of one oil supply surface was not less than 0.03 (mm²) and not more than $0.2 \times Di^2$ (mm²) to the inner diameter Di (mm) of the sliding surface, the bearing and the shaft did not seize and the bearing property is excellent under environment of high speed and high load. Among these, No. 1 to 12 in which the area ratio "a" of the sliding surface was not less than 0.4 and not more than 0.98 and the mean open size of the pores at the sliding surface was less than 20 μm are excellent in the bearing property especially in the high load environment.

INDUSTRIAL APPLICABILITY

The frictional coefficient is reduced by supplying sufficient oil to the sliding surface and the sliding property is improved by preventing the supplied oil from moving inside the bearing from the sliding surface so as to enable to use under the high speed and high load environment.

REFERENCE SIGNS LIST 1, 101, 102 Oil impregnated sintered bearing
2 Bearing hole
3 Oil supply surface
4 Sliding surface
5A Green compact
6 Porous body
7 Dense layer
11 Shaft
11a Outer peripheral surface
20 Forming die
21 Forming die plate
22 Forming core rod
22a Outer peripheral surface (of forming core rod)
22b Protruded part
23 Forming lower punch
24 Forming upper punch
25 Cylindrical space
30 Sizing die
31 Sizing die plate
32 Sizing core rod
32a Outer peripheral surface (of sizing core rod)
33 Sizing lower punch
34 Sizing upper punch
51a Protruded part (of green compact)
51b Concave part (of green compact)
52a Protruded part (of sintered body)
52b Concave part (of sintered body)
b1 Length (of oil impregnated sintered bearing)
d0 Maximum height difference (of sintered body)
d1 Maximum height difference (of oil impregnated sintered bearing)
d2 Maximum height difference (of forming core rod)

Da Outer diameter (of shaft)
Dg Outer diameter (of sizing core rod)
Di Inner diameter (of sliding surface of oil impregnated sintered bearing)
Do Outer diameter (of outer peripheral surface of forming core rod)
S1 Step of forming green compact
S2 Step of sintering
S3 Step of sizing

The invention claimed is:

1. An oil impregnated sintered bearing made of a porous body with pores, having a bearing hole into which a shaft is inserted, comprising:
concave oil supply surfaces formed at an inner peripheral surface of the bearing hole and dispersed throughout the inner peripheral surface, and
a sliding surface with an inner diameter Di formed on the inner peripheral surface of the bearing hole to be continuous around the oil supply surfaces and holding an outer peripheral surface of the shaft, wherein
the oil is exuded from the pores,
a maximum height difference between the sliding surface and the oil supply surface is not less than 0.01% and not more than 0.5% of the inner diameter Di,
a surface aperture area ratio of the pores at the sliding surface is not less than 0% and not more than 10% and a surface aperture area ratio of the pores at the oil supply surfaces is more than 10% and less than 40%, and
each of the oil supply surfaces has an area of not less than 0.03 (mm$^2$) and not more 0.2×Di$^2$ (mm$^2$).

2. The oil impregnated sintered bearing according to claim 1, wherein an area ratio of the sliding surface to a whole area of the inner peripheral surface of the bearing hole is not less than 0.4 and not more than 0.98.

3. The oil impregnated sintered bearing according to claim 2, wherein the oil supply surfaces are provided more in both end parts than in a center part of a length direction of the bearing hole.

4. The oil impregnated sintered bearing according to claim 2, wherein the oil supply surfaces are provided more in a center part than in both end parts of a length direction of the bearing hole.

5. The oil impregnated sintered bearing according to claim 2, wherein a mean open size of the pores opening at the sliding surface of the bearing is not less than 0 μm and less than 20 μm.

6. The oil impregnated sintered bearing according to claim 5, wherein the oil supply surfaces are provided more in both end parts than in a center part of a length direction of the bearing hole.

7. The oil impregnated sintered bearing according to claim 5, wherein the oil supply surfaces are provided more in a center part than in both end parts of a length direction of the bearing hole.

8. The oil impregnated sintered bearing according to claim 1, wherein a mean open size of the pores opening at the sliding surface of the bearing is not less than 0 μm and less than 20 μm.

9. The oil impregnated sintered bearing according to claim 8, wherein the oil supply surfaces are provided more in both end parts than in a center part of a length direction of the bearing hole.

10. The oil impregnated sintered bearing according to claim 8, wherein the oil supply surfaces are provided more in a center part than in both end parts of a length direction of the bearing hole.

11. The oil impregnated sintered bearing according to claim 1, wherein the oil supply surfaces are provided more in both end parts than in a center part of a length direction of the bearing hole.

12. The oil impregnated sintered bearing according to claim 1, wherein the oil supply surfaces are provided more in a center part than in both end parts of a length direction of the bearing hole.

13. A method of manufacturing an oil impregnated sintered bearing comprising:
a step of forming green compact, forming a cylindrical green compact by filling material powder into a cylindrical space between a forming die plate and a forming core rod of a forming die and pressurizing,
a step of sintering, forming a sintered body by sintering the green compact, and
a step of sizing, correcting dimensions of the sintered body and forming a bearing hole by pushing and pressurizing the sintered body into a cylindrical space between a sizing die plate and a sizing core rod of a sizing die, wherein
in the step of forming the green compact, protruded parts are formed on at least a part of an outer peripheral surface of the forming core rod so as to protrude from the other part outward in a radial direction, concave parts and a convex part adjacent and continuous to the concave parts are formed on an inner peripheral surface of the green compact, said concave parts being dispersed throughout the inner peripheral surface,
in the step of sintering, the concave parts are formed into oil supply surfaces having pores through which oil is exuded and a surface aperture area ratio of more than 10% by sintering the pressured powder body, and
in the step of sizing, an outer peripheral surface of the sizing core rod is formed to be larger than an inner diameter of the convex part of the sintered body and smaller than an inner diameter of the concave parts; a sliding surface having a surface aperture area ratio of not less than 0% and not more than 10% is formed by compressing the convex part outward in a radial direction by the outer peripheral surface of the sizing core rod; a maximum height difference between the oil supply surfaces and the sliding surface is formed to be not less than 0.01% and not more than 0.5% of an inner diameter of the sliding surface; and an area of each of the oil supply surfaces is made to be not less than 0.03 (mm$^2$) and not more than 0.2×Di$^2$ (mm$^2$) to an inner diameter Di of the bearing hole.

14. The method of manufacturing an oil impregnated sintered bearing according to claim 6, wherein a maximum height difference between the outer peripheral surface and the protruded parts of the forming core rod is not less than 0.1% and not more than 1.0% of an outer diameter of the outer peripheral surface of the forming core rod.

15. The method of manufacturing an oil impregnated sintered bearing according to claim 14, wherein
dimensions of the green compact are configured so that a maximum height difference between the convex part and the concave parts of the sintered body is not less than 0.1% and not more than 1.0% of an inner diameter of the convex part.

16. The method of manufacturing oil impregnated sintered bearing according to claim 13, wherein
dimensions of the green compact are configured so that a maximum height difference between the convex part and the concave parts of the sintered body is not less than 0.1% and not more than 1.0% of an inner diameter of the convex part.

* * * * *

UNITED STATES PATENT AND TRADEMARK OFFICE
CERTIFICATE OF CORRECTION

| | |
|---|---|
| PATENT NO. | : 11,248,654 B2 |
| APPLICATION NO. | : 16/763500 |
| DATED | : February 15, 2022 |
| INVENTOR(S) | : Hajime Kouno |

It is certified that error appears in the above-identified patent and that said Letters Patent is hereby corrected as shown below:

On the Title Page

Item (73), Assignee, Line 1:
"MITSUBISHI MATERIALS CORPORATION, Tokyo (JP);
DIAMET CORPORATION, Niigata-shi (JP)" should be -- DIAMET CORPORATION, Niigata-shi (JP) --.

Signed and Sealed this
Third Day of May, 2022

Katherine Kelly Vidal
*Director of the United States Patent and Trademark Office*